United States Patent
Lambert et al.

(10) Patent No.: US 7,333,329 B2
(45) Date of Patent: Feb. 19, 2008

(54) MEDIA DRIVE CONTAINMENT APPARATUS AND METHOD

(75) Inventors: Jeff Lambert, Cypress, TX (US); Pete Austin, Spring, TX (US); Donald Hall, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 258 days.

(21) Appl. No.: 10/837,066

(22) Filed: Apr. 30, 2004

(65) Prior Publication Data

US 2005/0243507 A1   Nov. 3, 2005

(51) Int. Cl.
*G06F 1/16* (2006.01)
(52) U.S. Cl. ............. 361/685; 312/223.1; 411/401
(58) Field of Classification Search ........ 361/679–682, 361/724–727, 801; 312/223.1, 227.1, 223.2, 312/265.1; 451/8, 10; 411/401
See application file for complete search history.

(56) References Cited

U.S. PATENT DOCUMENTS

| | | | |
|---|---|---|---|
| 5,045,960 A | 9/1991 | Eding | |
| 5,822,162 A | 10/1998 | Tannert | |
| 6,097,567 A | 8/2000 | Hanson | |
| 6,257,682 B1 * | 7/2001 | Liu et al. | 312/223.2 |
| 6,271,989 B1 | 8/2001 | Tannert | |
| 6,293,636 B1 * | 9/2001 | Le et al. | 312/223.2 |
| 6,407,910 B1 | 6/2002 | Diaz et al. | |
| 6,452,792 B1 | 9/2002 | Chen | |
| 6,462,940 B1 * | 10/2002 | Diaz et al. | 361/683 |
| 7,031,149 B2 * | 4/2006 | Dean et al. | 361/685 |
| 2005/0063151 A1 * | 3/2005 | Dean et al. | 361/685 |
| 2005/0068720 A1 * | 3/2005 | Lambert et al. | 361/685 |
| 2005/0214098 A1 * | 9/2005 | Franke et al. | 411/401 |

* cited by examiner

*Primary Examiner*—Hung Van Duong (57) ABSTRACT

Various embodiments of a media drive containment apparatus and methods are provided. In one representative embodiment a media drive containment apparatus includes a drivecage which supports at least one media drive. The drivecage is moveable along an axis from an operating position to a release position and the movement of the drivecage to the release position unlocks the media drive from the drivecage.

17 Claims, 7 Drawing Sheets

MEDIA DRIVE CONTAINMENT APPARATUS AND METHOD

BACKGROUND

A media drive containment apparatus is used to position and secure one or more media drives, for example, floppy disk drives and optical disk drives in equipment that uses media drives. A media drive containment apparatus is commonly found in computers among components which are compactly arranged and space to access them is limited.

It may be necessary for a user to go through the tedious process of manipulating the media drive containment apparatus using special tools and techniques in order to gain access to the media drives and the other components which must be tested or replaced. Servicing the media drive or surrounding components may require that the user use two hands to remove the media drive from the media drive containment apparatus. For example, it may be required that the media drive first be moved to a new position and then remain supported in that position by one hand while a second hand is simultaneously used to unlock the media drive from the media drive containment apparatus. Such arrangements can present difficulties for some users and can be time consuming.

BRIEF DESCRIPTION OF THE SEVERAL VIEWS OF THE DRAWINGS

The example embodiments of the present invention can be understood with reference to the following drawings. The components in the drawings are not necessarily to scale. Also, in the drawings, like reference numerals designate corresponding parts throughout the several views.

DETAILED DESCRIPTION

For convenience, a media drive containment apparatus in accordance with example embodiments of the present invention is described within the environment of a computer, for example, a small form factor, however one of ordinary skill in the art can appreciate that embodiments of the media drive containment apparatus could be used in other devices.

Figure 1:
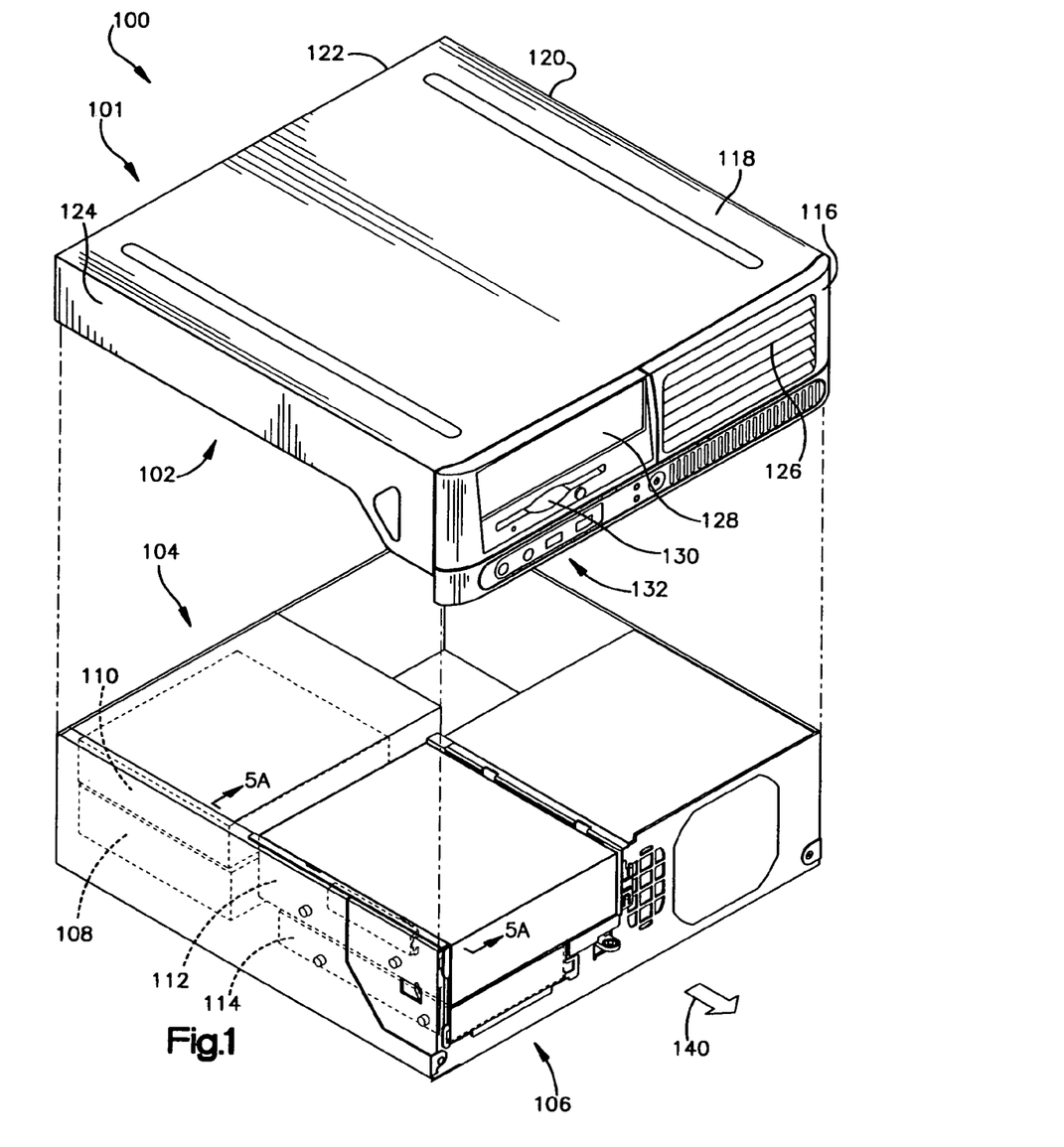
FIG. 1 is an exploded view of a computer showing the media drive containment apparatus according to an embodiment of the invention.

FIG. 1 shows an exploded view of a computer 100 that includes a housing 101 having top portion 102 and a base portion 104. The base portion supports a media drive containment apparatus 106 as well as several internal components which may surround it, for example, a hard drive 108 (shown in phantom) and a power supply 110 (shown in phantom). The drive media containment apparatus 106 includes at least one media drive, for example media drive 112 (shown partially in phantom) and media drive 114 (shown partially in phantom).

The top portion 102 of the housing 101 can be aesthetically pleasing and can include a front bezel 116, a top wall 118, side walls 120, 122, 124, any of which may be adapted to mount to the bottom portion 104 of the housing 101. The bezel 116 may include, for example, vents 126 for circulation of the air and cutouts 128, 130, to expose the removable media drives 112, 114, and the various I/O ports 132. The I/O ports 132 may include convention port/connectors for connecting the computer to typical I/O devices such as, for example, the modem, speaker, scanner, display monitor, mouse, and keyboards, etc. The housing 101 can be constructed of a sheet metal made of, for example, cold-rolled steel, and can have a thickness that ranges from about 0.6 mm to about 1.2 millimeters. However, the housing 101 may have alternative wall thickness dimensions and may be made of different types of materials, including metals, alloys and polymers.

The media drive containment apparatus 106 which contain the media drives 112, 114, as well as the other internal components of the computer 100, are accessible to the user for repair or replacement typically by removing the top portion 102 of the housing 101. The media drive containment apparatus 106 is shown in FIG. 1 in the operating position, that is, the position in which the media drives 112, 114 are in operation. When the media drive containment apparatus 106 is in the operating position another internal component, for example, the hard drive 108 or the motherboard (not shown), may be inaccessible.

Figure 2:
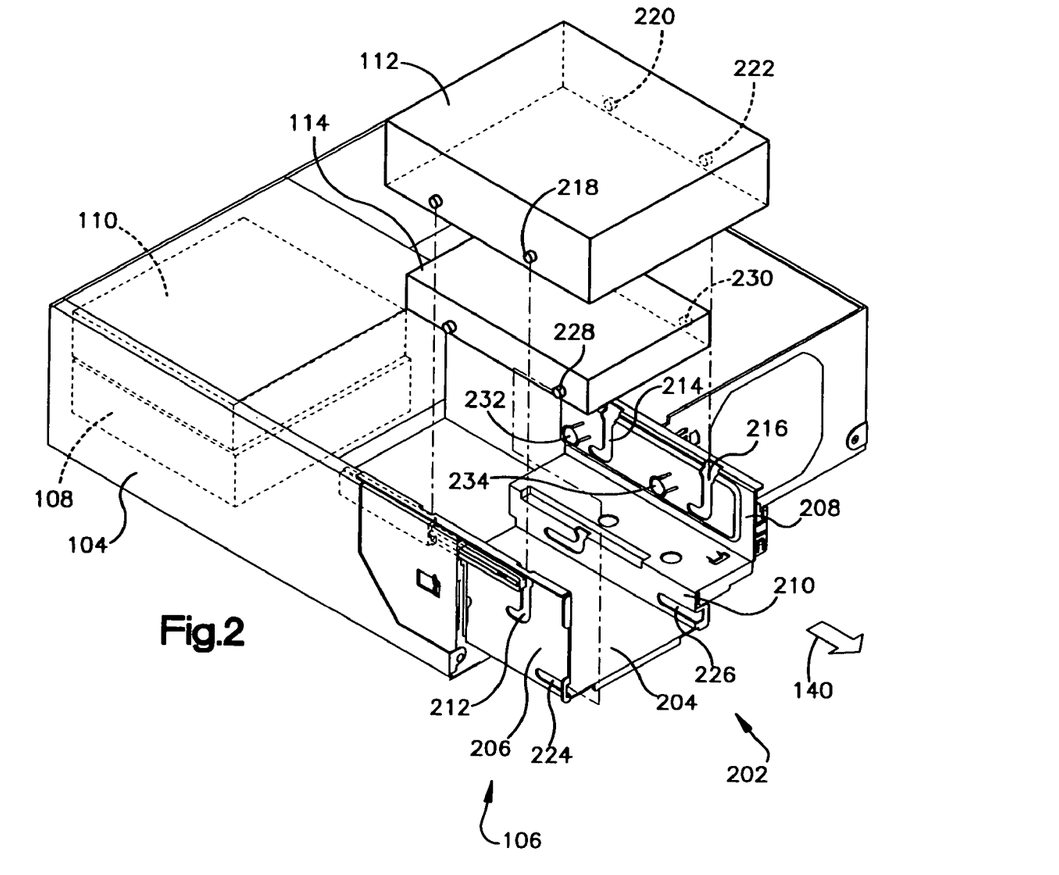
FIG. 2 is an exploded view of the media drive containment apparatus of FIG. 1 showing the drivecage and the media drives according to an embodiment of the invention.

FIG. 2 is an exploded perspective view of the media drive containment apparatus 106 which includes a drivecage 202 movable along an axis indicated by arrow 140. The drivecage 202 has a support base 204 for mounting at least one media drive, for example, media drives 112, 114. The drivecage 202 is shown having a stepped support base 204 so that the drivecage 202 can support at least two media drives of different size. For example, the width of upper media drive 112 can be sized for a 5¼ inch optical disc drive (ODD) such as a CD, and the width of lower media 114 drive can be 3½ inches for a disc drive (DD) such as a floppy disc. The wall 206 of the drivecage 202 extends upward from the support base 204 and provides resistance against both the first and the second media drives, and walls 208 and 210 extend upward from the support base 204 to provide resistance against media drives 112 and 114, respectively.

An upward extending wall, for example, walls 206, 208 and 210, can include at least one guide slot for receiving at least one media drive that is supported by the drivecage 202. For example, guide slots 212, 214, and 216 receive pins 218, 220 and 222, respectively, which protrude from media drive 112, and guide slots 224 and 226 receive pins 218 and 222, respectively, which protrudes from media drive 114. The guide slots 212, 214, and 216 each have a closed end and an open end for positioning and removing the media drives as will be discussed further. Guide slots 212, 214, and 216 are shown in the contour of a "J" and guide slot 224 extends horizontally along the side of the housing 101, however, other contours of the guide slots 212, 214, and 216 are possible.

Pins 218, 220, 222, and pins 228 and 230 are shown as integral portion of media drives 112 and 114, respectively, but the pins can be a separate component physically connected to the media drives. The pins can aid the user in the correct placement of the media drives 112, 114, within the drivecage 202, and can also serve as an interference component by which movement of drive media 112, 114 relative to the drivecage 202 can be restricted. The drivecage 202 can also include spring fingers 232, 234 along wall 208, opposite wall 206 having guide slots. Spring fingers 232, 234 provide a biasing force against the media drives 112, 114 under shake and vibration conditions in order to insure that the pins, such as, for example, pins 218 and 228 of media drives 112, 114 are not pulled out of the guide slots 212, 224, respectively.

Figure 3A:
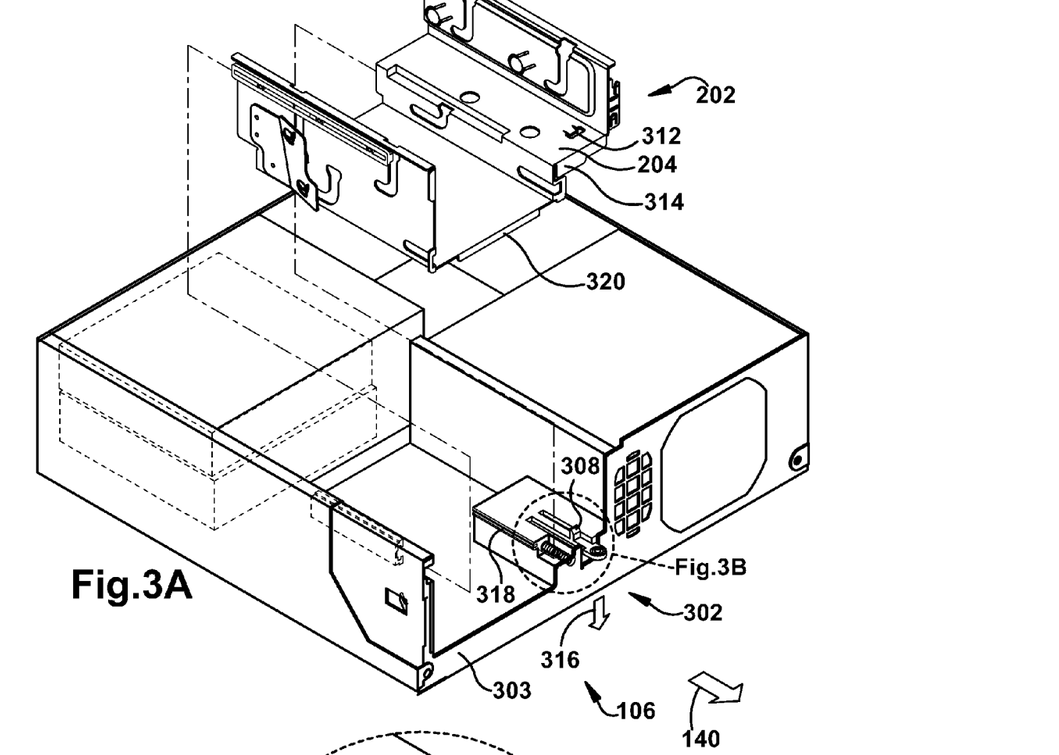
FIG. 3A is an exploded view of the media drive containment apparatus of FIG. 2 showing the drivecage and the drivecage actuator according to an embodiment of the invention.

FIG. 3A is a perspective view of the media drive containment apparatus 106 showing the drivecage 202 lifted away to reveal the drivecage actuator 302. The drivecage actuator 302 functions to unlock, or both unlock and eject the drivecage 202 from its operating position. The movement of drivecage 202 along axis 140 can be orthogonal to the front panel 303 of the base portion 104 of housing 101 (FIG. 1). This movement of the drivecage 202 along axis 140 provides clearance in and around the media drive containment apparatus 106 so that surrounding components such as the hard drive 108 (FIG. 1) can be accessed for upgrading, maintenance, repair, or replacement. The drivecage 202 can have a range of displaced positions along axis 140 in which access to components is no longer blocked, and the drivecage 202 is moveable at least from an operating position to a release position at which location the media drives 112, 114 become unlocked from the drivecage 202.

Figure 3B:
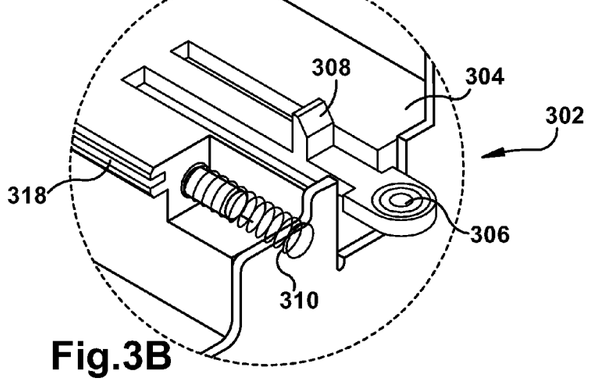
FIG. 3B is a breakout view of a portion of the drivecage actuator shown in FIG. 3A according to an embodiment of the invention.

The components of drivecage actuator 302 can be seen in the breakout illustration of FIG. 3B. The drivecage actuator 302 includes a main body 304, an actuator button 306, an actuator arm 308, and an actuator spring 310. When the drivecage 202 is in the operating position within the media drive containment apparatus 106 the actuator arm 308 is extended through opening 312 (FIG. 3A) of the support base 204 of drivecage 202, thereby preventing movement of the drivecage 202 from its operating position. In the operating position the actuator spring 310 is compressed by a downward extending lip 314 (FIG. 3A) of the drivecage support base 204 (FIG. 3A).

Referring to FIGS. 3A and 3B, when the actuator button 306 is pushed, for example, in a downward position as indicated by arrow 316, the actuator arm 308 moves beneath the drivecage support base 204, and the drivecage 202 is free to pass over the opening 312. The compressive force stored in the actuator spring 310 is applied to the downward extending lip 314 of the drivecage 202 and the drivecage 202 moves out of the operating position and some distance, typically a slight distance, along axis 140. When the spring ejects the drivecage 202 the movement of the drivecage 202 external to the housing 101 can ensure that the media drives or other internal components of the computer are ready for accessing and indicates to the user the axis along which the drivecage 202 is to move.

When the user returns the drivecage 202 to the operating position and applies a force the drivecage 202 that is greater than the spring tension of actuator spring 310, the applied force coupled with the resiliency of actuator body 304 causes the actuator arm 308 to protrudes above the support base 204 of the drivecage 202 thereby creating an interference that locks the drivecage 202 into the operating position. The downward extending lips 314 and 320 of drivecage 202 can be pressed flush with the front panel 303 when in the operation position.

The main body 304 of the drivecage actuator 302 can also include a recess 318 that receives an edge (not shown) along the support base of the drivecage 202. The main body 304 of the drivecage actuator 302, as well as the actuator arm 308 and the actuator button 306, can be made of a metal or polymer that has adequate tensile strength but is also resilient to translate the interactive forces which are applied to the actuator spring 310 and the actuator button 306.

Figure 4:
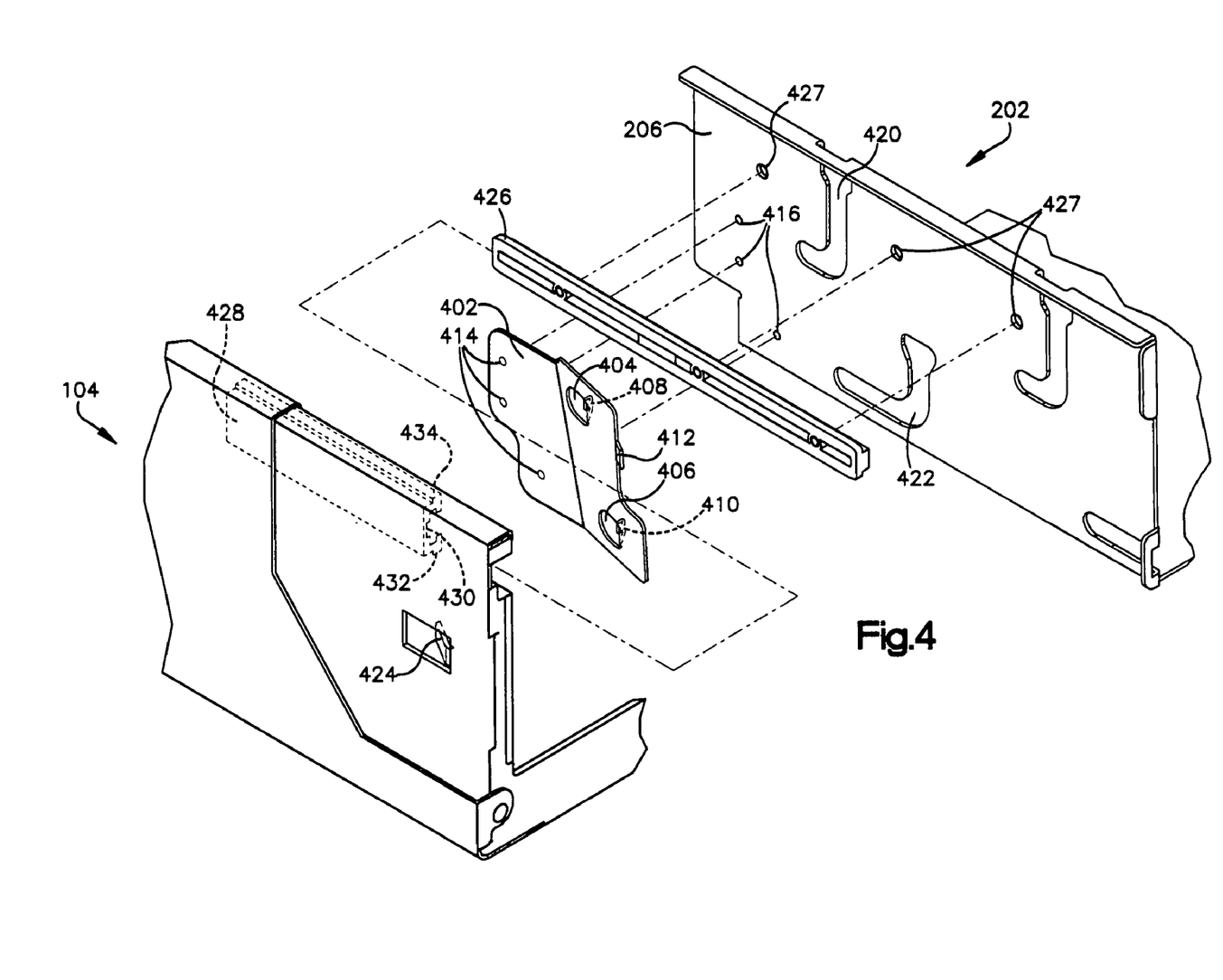
FIG. 4 is an exploded view of a portion of the media drive containment apparatus of FIG. 3A according to an embodiment of the invention.

FIG. 4 is an exploded view of a portion of the media drive containment apparatus 106 shown in FIGS. 1, 2, 3A, according to an embodiment of the present invention. The drivecage 202 can include a retainer 402 disposed on the drivecage, for example, along wall 206. The retainer has at least one opening, for example, openings 404 and 406, at least one spring tab, for example, spring tabs 408 (shown in phantom) and 410 (shown in phantom), and a drivecage latch 412. The retainer 402 is in physical communication with drivecage 202 in that it can be can be integral with the drivecage 202 as a whole (e.g. is included as a portion of the wall 206), or the retainer 402 can be a separate component attached to the drivecage 202, for example, via stakes 414 forced through holes 416, or via one of several conventional methods, such as screw and threaded bore, screw and nut connection, rivets, solder welds, locking flanges, etc. The portion the retainer 402 having spring tabs 408 and 410 should be free to move away from wall 206 of drivecage 202 for purposes of unlocking the media drives 112, 114, (FIG. 2) as will be described. The retainer 402 can be made of a metal or polymer that will allow the portion of the retainer 402 having spring tabs 408, 410, to flex toward and away from the wall 206 of drivecage 202. The retainer 402 can be made of a different material than the drivecage 202, for example, the drivecage 202 can be made of cold-rolled steel and the retainer 402 can be made of stainless steel.

Openings 404 and 406 at least partially align with guide slot 420 and 422, respectively, to receive pins of media drives 112 and 114, respectively (FIG. 2). Thus, when the media drives are locked in the drivecage 202, for example, when the drivecage 202 is in the operating position, as shown in FIG. 1, the pins of the media drives are positioned through the guide slots 420, 422, and surrounded by the openings 404 and 406. This prevents the media drive from being removed from the drivecage 202 until the drivecage 202 is moved to the release position as will be further described. The spring tabs 408, 410, protrude outward from the retainer 402 and toward the wall 206 of drivecage 202 a distance such that they interfere with the pins of media drives 112, 114, (FIG. 2) when they are placed into guide slots 420, 422. The spring tabs can also protrude beyond the distance of interference and into the guide slots 420, 422.

The retainer 402 of drivecage 202 also includes a drivecage latch 412 that protrudes outward and away from the wall of the retainer 402. The housing 101 (FIG. 1), for example the bottom portion 104, includes a housing latch 424 that protrudes inward toward the drivecage 202. In the release position, the drivecage latch 412 and the housing latch 424 contact one another to unlock the media drives 112, 114, at the release position as will be further described below.

FIG. 4 also illustrates a mechanism by which the drivecage 202 can be supported in the media drive containment apparatus 106. The drivecage 202 can include a slide 426 connected to wall 206, for example, through screw and nut connection through holes 427 of wall 206, or one of many conventional methods known to one skilled in the art. The base portion 104 of housing 101 (FIG. 1) includes a rail 428 for receiving and supporting the slide 426 along the axis of movement 140 (FIG. 2) from the operating position to the release position, or beyond. The rail 428 has a recess 430 which is dimensioned to receive the slide 426 of the drivecage 202. The rail 428 has a lower guide 432 that supports the drivecage 202 and optionally an upper guide 434 that restricts the drivecage 202 along one axis and ensures that the drivecage 202 does not tip when in motion.

Figure 5A:
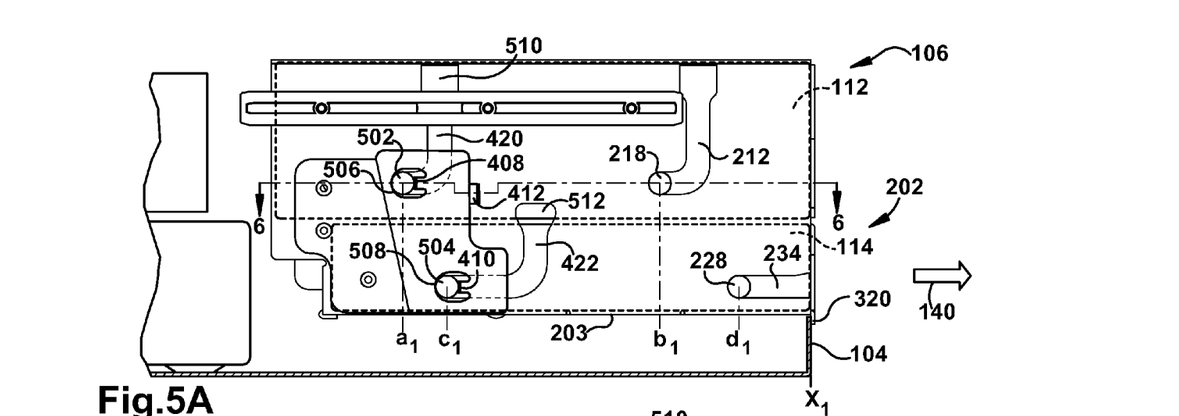
FIG. 5A is a cutaway cross-sectional view of the computer taken along the lines 5A-5A of FIG. 1 showing the media drive containment apparatus and the drivecage in the operating position according to an embodiment of the invention.

With reference to FIGS. 5A through 5D, the manner by which the media drives 112 and 114 (shown in phantom) can be removed from a media drive containment apparatus 106 can be described according to an example embodiment of the present invention. FIG. 5A is a cross-sectional view of a portion of computer taken along lines 5-5 of FIG. 1. The media drives 112, 114 are shown in the media drive containment apparatus 106 in the operating position. The drivecage 202 is inside the housing 101 and downward extending lip 320 is positioned at location $X_1$ along the axis of movement. In the operating position pin 502 of the upper media drive 112 extends through the guide slot 420 of the drivecage 202 and the opening 404 (FIG. 4) of the retainer 402. Likewise, pin 504 of the lower media drive 112 extends through guide slot 422 of the drivecage 202 and the opening 410 (FIG. 4) of the retainer 402. The spring tabs 408 and 410 disposed along the along the edge of the openings 404 and 406 (FIG. 4) of retainer 402 protrude toward the guide slots 420, 422, such that the movement of pins 502 and 504 are restricted by the spring tabs 408 and 410, and the closed ends 506 and 508 of the guide slots 420 and 422, respectively. Spring tab 408 is positioned between pin 502 and the open end 510 of guide slot 420, and spring tab 410 is positioned between pin 504 and the open end 512 of the guide slot 422, thereby obstructing pins 502, 504 from moving to the open ends of the guide slot 420 and 422. Therefore, when the media drive containment apparatus 106 is in the operating position the pins 502 and 218 of media drive 112 are located at positions $a_1$ and $b_1$, respectively, and pins 504 and 228 of media drive 114 are located along the position $c_1$ and $d_1$, respectively. It is not necessary that pins 218 and 228 be locked in the drivecage 202 so long as at least one pin 502, 504 of each media drive is in the locked position.

Figure 6:
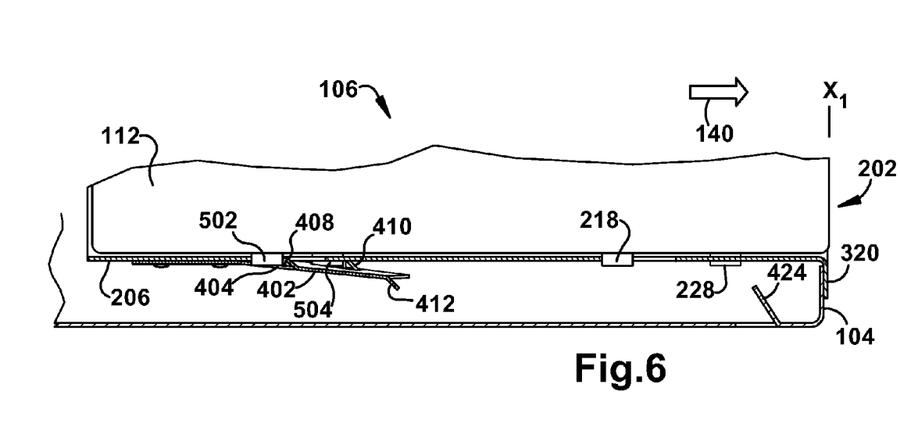
FIG. 6 is a top cross-sectional view of the media drive containment apparatus taken along lines 6-6 of FIG. 5A showing the drivecage in the locked position according to an embodiment of the invention.

FIG. 6 shows another view of the physical arrangement by which media drive 112 is locked in the drivecage 202. FIG. 6 is a top cross-sectional view taken along lines 6-6 of FIG. 5A showing the media drives 112 and pin 504 of media drive 114 locked in media drive containment apparatus 106 while in the operating position. Pins 502 and 504 protrude from media drives 112 and 114, respectively, through guide slots 420 and 422 (FIG. 5A) wall 206 of drivecage 202 and also through openings 404 and 406 of retainer 402 (FIG. 4). The spring tabs 408 and 410 of retainer 402 protrude inward toward wall 206 of drivecage 202 such that they create an interference surface against pins 502 and 504, respectively, enough so that the pins are restricted from moving to the open end 510, 512, (FIG. 5A) of slots 420, 422, (FIG. 5A), respectively, and the media drives cannot be removed. Also, in the operating position the drivecage latch 412 is separated a distance from the housing latch 424.

Figure 5B:
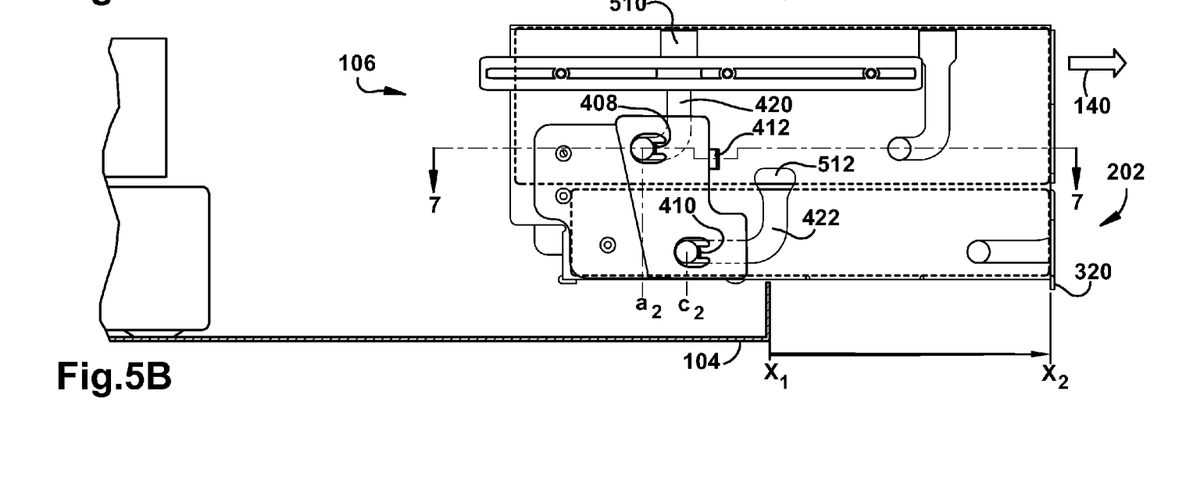
FIG. 5B is a cutaway cross-sectional view of the computer of FIG. 5A showing the media drive containment apparatus and the drivecage in the release position according to an embodiment of the invention.

FIG. 5B shows the drivecage 202 after it has been moved along the axis indicated by arrow 140 with the drivecage 202 located in the release position. At least a portion of the drivecage 202 is moved external to the housing 101, with the lower extending lip 320 of drivecage 202 located at position $X_2$. The drivecage 202 is in the release position when the drivecage latch 412 on retainer 402 has engaged the housing latch (not shown) such that the engagement causes the spring tabs 408, 410, to move enough so that the pins 502 and 504 are free to move to the open ends 510, 512, of guide slots 420, 422, respectively.

Figure 7:
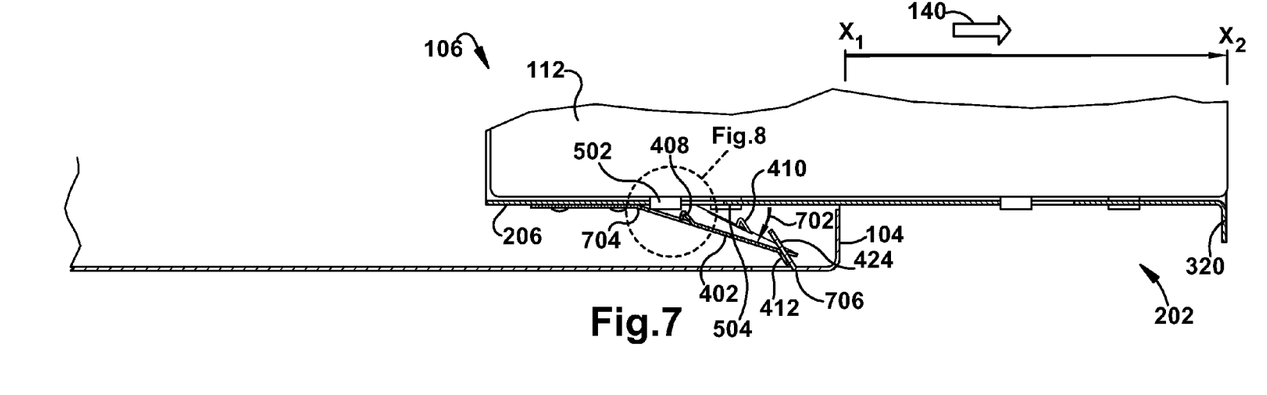
FIG. 7 is a top cross-sectional view of the media drive containment apparatus of FIG. 5B showing the drivecage in the release position according to an embodiment of the invention.

FIG. 7 is a top cross-sectional view taken along lines 7-7 of FIG. 5B showing the media drives 112 and pin 504 unlocked in media drive containment apparatus 106 while in the release position. As drivecage 202 moves along the axis from position $X_1$ to $X_2$ (FIG. 5B) the contact between the drivecage latch 412 and the housing latch 424 causes displacement of the spring tabs 408, 410, in a radial motion as indicated by arrow 702 about a pivotal axis 704. The displacement of the spring tabs is great enough to allow the pins 502, 504, to move to the open end 510, 512, (FIG. 5A) of guide slots 420 and 422, respectively. Drivecage latch 412 protrudes away from retainer 402, and housing latch 424 protrudes towards drivecage 202 and away from base portion 104 of housing 101 such that the drivecage latch 412 and the housing latch 424 contact one another. Upon contact, the pins 502, 504, may not be immediately released, however, as the drivecage 202 continues to move along the axis indicated by arrow 140 the angle of protrusion of housing latch 424 causes drivecage latch 412 to slide along housing latch while gradually being displaced further. Drivecage latch 412 and housing latch 424 can have one of several geometric profiles, for example angled (as shown) or radius profiles. Once the drivecage latch 402 reaches the base 706 of housing latch 424, the drivecage can no longer move along the axis indicated by arrow 140. At this point, the displacement of spring tabs 408 and 410 a distance that is necessary to give clearance to pins 502 and 504, respectively.

Figure 8:
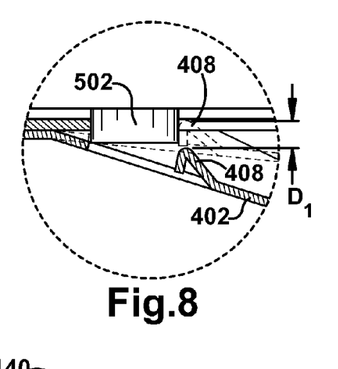
FIG. 8 is breakout perspective illustration of a portion of the media drive containment apparatus of FIG. 7 according to an embodiment of the invention.

FIG. 8 shows a breakout illustration of a portion of the media drive containment apparatus 106 showing pin 502 of media drive 112 unlocked at the release position. The spring tab 408 is displaced a distance $D_1$ from where the drivecage 202 is in the operating position (shown in phantom) to where the drivecage is in the release position.

Figure 5C:
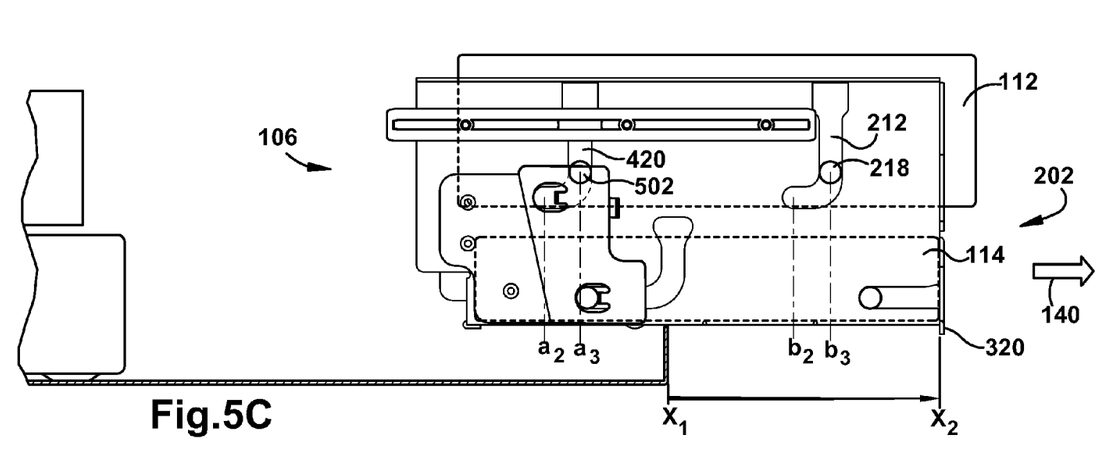
FIG. 5C is a cutaway cross-sectional view of the computer of FIG. 5B with a first media drive unlocked and partially removed from the drivecage according to an embodiment of the invention.

In FIG. 5C is a cutaway cross-sectional view of the computer of FIG. 5B with the media drives 112 and 114 (shown in phantom) unlocked in the release position and media drive 112 partially removed from the drivecage 202. Media drive 112 is partially pulled from the drivecage 202 and the pins 502 and 218 of media drive 112 have been moved from position $a_2$ to $a_3$ and from $b_2$ to $b_3$, respectively. Thus, once the drivecage 202 has been moved in a direction indicated by arrow 140, the media drive can continue to move, relative to the drivecage 202 once the drivecage 202 has reached the release position. This allows a user to quickly remove the media drive 112 with one hand by pulling the media drive out of the drivecage 202. The direction by which the media drives 112, 114 are moved can depend on the contour of the guide slots in a motion that patterns the contour, for example, in the direction indicated by arrow 140 and then up for the "J" shaped contour of guide slots 420 and 212, however, other contours, such as vertical or angled contours of guide slots 420, 212, may be possible.

Figure 5D:
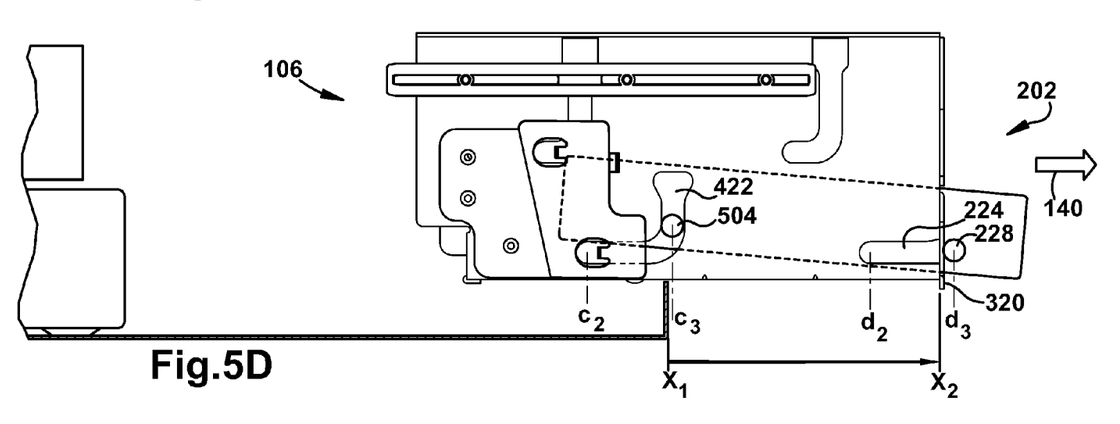
FIG. 5D is a cutaway cross-sectional view of the media drive containment apparatus of FIG. 5C showing the first media drive completely removed from the drivecage and a second media drive unlocked and partially removed from the drivecage according to an embodiment of the invention.

In FIG. 5D media drive 112 is completely removed from the drivecage 202 and at least a portion of media drive 114 is moved outside the drivecage 202. Pin 504 of media drive 114 is moved from a location at $c_2$ to a location at position at $c_3$, and pin 228 has been moved completely from the guide slot 224 from position $d_2$ to position $d_3$.

FIGS. 5 through 8 show that at least one media drive, for example media drives 112, 114, can be removed from the media drive containment apparatus 106, first by moving the drivecage 202 along the axis indicated by arrow 140 from the operating position to a release position where the media drives 112, 114, become unlocked from the drivecage 202. Next, the user continues to move the media drives 112, 114 relative to the drivecage 202 along the same axis, as the pins 502, 504, 218, slide forward in the guide slots 420, 422, and 212, respectively. Lastly, the user can lift the drives up and out of the drivecage 202, where the pins 502, 504, 218 slide upward and out of their respective guide slots 420, 422, and 212. This enables the user to remove the media drives by contacting only the media drives and using only one hand.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A media drive containment system comprising:
   a drivecage movable from an operating position to a release position;
   a media drive supported by the drivecage;
   wherein movement of the drivecage to the release position causes unlocking of the media drive from the drivecage;
   a housing that supports the drivecage; and
   wherein the drivecage is at least partially external to the housing in the release position.

2. The media drive containment system of claim 1, wherein the movement of the drivecage is restricted to movement along one axis.

3. A media drive containment system comprising:
   a drivecage movable from an operating position to a release position, wherein the drivecage comprises a drivecage latch;
   a media drive supported by the drivecage, wherein movement of the drivecage to the release position causes unlocking of the media drive from the drivecage;
   a housing that supports the drivecage, wherein the drivecage is at least partially external to the housing in the release position, wherein the housing comprises a housing latch; and
   wherein the drivecage latch contacts the housing latch when the drivecage is in the release position.

4. The media drive containment system of claim 3, wherein the drivecage latch is part of a retainer that is in physical communication with the drivecage.

5. The media drive containment system of claim 3, wherein:
   the drivecage defines a guide slot having a closed end and an open end;
   the media drive comprises a pin that extends through the guide slot; and
   the drivecage comprises a spring tab that is positioned between the pin and the open end of the guide slot, thereby obstructing movement of the pin to the open end of the guide slot until the drivecage is in the release position.

6. The media drive containment system of claim 5, wherein contact between the drivecage latch and the housing latch at the release position causes displacement of the spring tab, thereby allowing movement of the pin to the open end of the guide slot.

7. The media drive containment system of claim 6, wherein the spring tab and the drivecage latch are part of a retainer that is in physical communication with the drivecage.

8. The media drive containment system of claim 7, wherein the retainer is biased by the contact between the drivecage latch and the housing latch to displace the spring tab.

9. The media drive containment system of claim 8, wherein the retainer latch extends away from the drivecage and the housing latch extends away from the housing such that movement of the drivecage along the first axis causes displacement of the spring tab along the second axis from a lock position to an unlock position.

10. The media drive containment system of claim 7, wherein:
    the spring tab and the retainer latch comprises the same material composition, which is different than the material composition of the housing.

11. A media drive containment system comprising:
    a drivecage movable from an operating position to a release position;
    a media drive supported by the drivecage;
    wherein movement of the drivecage to the release position causes unlocking of the media drive from the drivecage;
    the drivecage further comprises a slide;
    the drivecage is disposed in a housing;
    the housing further comprises a rail; and
    the slide is in physical communication with the rail and restricts the movement of the drivecage to movement along one axis between the operating position and the locking position.

12. A media drive containment system comprising:
    a drivecage that supports a media drive, the drivecage being movable between an operating position and a release position;
    means associated with the drivecage and a housing within which the drivecage is disposed for unlocking the media drive from the drivecage by virtue of movement of the drivecage from the operating position to the release position; and
    wherein the drivecage is at least partially external to the housing at the release position.

13. The media drive containment system of claim 12, further comprising means for constraining the movement of the drivecage along one axis.

14. A media drive containment system comprising:
    a drivecage that supports a media drive, the drivecage being movable between an operating position and a release position; and means for unlocking the media drive from the drivecage when the drivecage is moved to the release position comprising:

a drivecage latch disposed on the drivecage; and a housing latch disposed on a housing, wherein media drive is unlocked when the drivecage latch engages the housing latch when the drivecage is at the release position.

15. The media drive containment system of claim 14, wherein:

the drivecage defines a guide slot comprising a closed end and an open end;

the media drive comprises a pin that extends through the guide slot of the drivecage;

the drivecage comprises a spring tab that obstructs the movement of the pin to the open end of the slot when the drivecage is in the operating position and does not obstruct the movement of the pin of the media drive to the open end of the slot when the drivecage is in the release position; and wherein contacting the drivecage latch with the housing latch displaces the spring tab to allow movement of the pin along slot of the drivecage to the open end of the slot.

16. A method for removing a media drive from a media drive containment system comprising:

moving a drivecage that supports the media drive along an axis to a release position to unlock the media drive within the drivecage;

contacting a drivecage latch with a housing latch while moving the drivecage along the axis to unlock the media drive from the drivecage; and sliding the media drive out of the drivecage after the drivecage has reached the release position.

17. The method of claim 16, further comprising moving a spring tab which is in physical communication with the drivecage in direction distinct from the axis while the drivecage latch is in contact with the housing latch.

* * * * *